US00RE41115E

(19) United States
(12) Reissued Patent
Schulte et al.

(10) Patent Number: US RE41,115 E
(45) Date of Reissued Patent: Feb. 16, 2010

(54) CLEANING SYSTEM UTILIZING AN ORGANIC CLEANING SOLVENT AND A PRESSURIZED FLUID SOLVENT

(75) Inventors: James E. Schulte, Cicero, IL (US); Timothy L. Racette, Plainfield, IL (US); Gene R. Damaso, Northlake, IL (US)

(73) Assignee: Eminent Technologies LLC, Naperville, IL (US)

(21) Appl. No.: 12/228,543

(22) Filed: Aug. 13, 2008

Related U.S. Patent Documents

Reissue of:
(64) Patent No.: 7,147,670
Issued: Dec. 12, 2006
Appl. No.: 10/427,426
Filed: Apr. 30, 2003

U.S. Applications:

(63) Continuation-in-part of application No. 09/843,103, filed on Apr. 25, 2001, now Pat. No. 6,558,432, which is a continuation-in-part of application No. 09/419,345, filed on Oct. 15, 1999, now Pat. No. 6,355,072.

(51) Int. Cl.
*D06L 1/02* (2006.01)

(52) U.S. Cl. ..... 8/142; 134/26; 134/42
(58) Field of Classification Search ..... 8/142; 134/26, 42
See application file for complete search history.

(56) References Cited

U.S. PATENT DOCUMENTS

| | | | | |
|---|---|---|---|---|
| 210,965 | A | * 12/1878 | Rhoads | 137/133 |
| 3,701,627 | A | 10/1972 | Grunewalder | |
| 3,966,981 | A | 6/1976 | Schultz | |
| 4,012,194 | A | 3/1977 | Maffei | |
| 4,129,718 | A | 12/1978 | Muzzio | |
| 4,309,300 | A | 1/1982 | Danforth et al. | |

(Continued)

FOREIGN PATENT DOCUMENTS

| | | |
|---|---|---|
| EP | 1092803 | 4/2001 |

(Continued)

OTHER PUBLICATIONS

Dyck et al., "Supercritical Carbon Dioxide Solvent Extraction from Surface–Micromachined Micromechanical Structures," SPIE Micromachining and Microfabrication, Oct. 1996.

(Continued)

*Primary Examiner*—Gregory E Webb
(74) *Attorney, Agent, or Firm*—K&L Gates LLP

(57) ABSTRACT

A cleaning system that utilizes an organic cleaning solvent and pressurized fluid solvent is disclosed. The system has no conventional evaporative hot air drying cycle. Instead, the system utilizes the solubility of the organic solvent in pressurized fluid solvent as well as the physical properties of pressurized fluid solvent. After an organic solvent cleaning cycle, the solvent is extracted from the textiles at high speed in a rotating drum in the same way conventional solvents are extracted from textiles in conventional evaporative hot air dry cleaning machines. Instead of proceeding to a conventional drying cycle, the extracted textiles are then immersed in pressurized fluid solvent to extract the residual organic solvent from the textiles. This is possible because the organic solvent is soluble in pressurized fluid solvent. After the textiles are immersed in pressurized fluid solvent, pressurized fluid solvent is pumped from the drum. Finally, the drum is de-pressurized to atmospheric pressure to evaporate any remaining pressurized fluid solvent, yielding clean, solvent free textiles. The organic solvent is preferably selected from terpenes, halohydrocarbons, certain glycol ethers, polyols, ethers, esters of glycol ethers, esters of fatty acids and other long chain carboxylic acids, fatty alcohols and other long-chain alcohols, short-chain alcohols, polar aprotic solvents, siloxanes, hydrofluoroethers, dibasic esters, and aliphatic hydrocarbons solvents or similar solvents or mixtures of such solvents and the pressurized fluid solvent is preferably densified carbon dioxide.

40 Claims, 2 Drawing Sheets

U.S. PATENT DOCUMENTS

| | | | |
|---|---|---|---|
| 4,619,706 | A | 10/1986 | Squires et al. |
| 4,824,762 | A | 4/1989 | Kobayashi et al. |
| 4,973,423 | A | 11/1990 | Geke et al. |
| 5,158,704 | A | 10/1992 | Fulton et al. |
| 5,266,205 | A | 11/1993 | Fulton et al. |
| 5,279,615 | A | 1/1994 | Mitchell et al. |
| 5,306,350 | A | 4/1994 | Hoy et al. |
| 5,316,591 | A | 5/1994 | Chao et al. |
| 5,370,742 | A | 12/1994 | Mitchell et al. |
| 5,377,705 | A | 1/1995 | Smith, Jr. et al. |
| 5,417,768 | A | 5/1995 | Smith, Jr. et al. |
| 5,456,759 | A | 10/1995 | Stanford, Jr. et al. |
| 5,486,314 | A | 1/1996 | Wack et al. |
| 5,574,002 | A | 11/1996 | Shiino et al. |
| 5,610,132 | A | 3/1997 | Momoda et al. |
| 5,676,705 | A | 10/1997 | Jureller et al. |
| 5,683,473 | A | 11/1997 | Jureller et al. |
| 5,683,977 | A | 11/1997 | Jureller et al. |
| 5,733,380 | A | 3/1998 | Murphy |
| 5,738,127 | A | 4/1998 | Heymanns et al. |
| 5,746,776 | A | 5/1998 | Smith et al. |
| 5,759,209 | A | 6/1998 | Adler et al. |
| 5,783,082 | A | 7/1998 | DeSimone et al. |
| 5,789,505 | A | 8/1998 | Wilkinson et al. |
| 5,858,022 | A | 1/1999 | Romack et al. |
| 5,865,852 | A | 2/1999 | Berndt |
| 5,866,005 | A | 2/1999 | DeSimone et al. |
| 5,868,856 | A | 2/1999 | Douglas et al. |
| 5,868,862 | A | 2/1999 | Douglas et al. |
| 5,888,250 | A | 3/1999 | Hayday et al. |
| 5,942,007 | A | 8/1999 | Berndt et al. |
| 5,943,721 | A | 8/1999 | Lerette et al. |
| 5,944,996 | A | 8/1999 | DeSimone et al. |
| 5,977,045 | A | 11/1999 | Murphy |
| 6,012,307 | A | 1/2000 | Malchow |
| 6,051,421 | A | 4/2000 | Sauer et al. |
| 6,090,771 | A | 7/2000 | Burt et al. |
| 6,120,613 | A | 9/2000 | Romack et al. |
| 6,148,644 | A | 11/2000 | Jureller et al. |
| 6,148,645 | A | 11/2000 | DeYoung et al. |
| 6,156,074 | A | 12/2000 | Hayday et al. |
| 6,200,352 | B1 | 3/2001 | Romack et al. |
| 6,204,237 | B1 | 3/2001 | Suzuki et al. |
| 6,211,422 | B1 | 4/2001 | DeSimone et al. |
| 6,258,766 | B1 | 7/2001 | Romack et al. |
| 6,273,919 | B1 | 8/2001 | Hayday |
| 6,277,753 | B1 | 8/2001 | Mullee et al. |
| 6,280,481 | B1 | 8/2001 | Storey-Laubach et al. |
| 6,306,564 | B1 | 10/2001 | Mullee |
| 6,344,243 | B1 | 2/2002 | McClain et al. |
| 6,350,287 | B1 | 2/2002 | Hayday |
| 6,355,072 | B1 | 3/2002 | Racette et al. |
| 6,491,730 | B1 | 12/2002 | Cauble, Jr. et al. |
| 6,558,432 | B2 | 5/2003 | Schulte et al. |
| 6,673,120 | B2 | 1/2004 | Hayday |
| 6,711,773 | B2 | 3/2004 | DeYoung et al. |
| 6,734,154 | B2 | 5/2004 | Flynn et al. |
| 6,736,859 | B2 | 5/2004 | Racette et al. |
| 6,755,871 | B2 | 6/2004 | Damaso et al. |
| 6,802,961 | B2 | 10/2004 | Jackson |
| 6,871,656 | B2 | 3/2005 | Mullee |
| 7,008,458 | B2 | 3/2006 | Hayday |
| 7,087,094 | B2 | 8/2006 | Galick et al. |
| 7,147,670 | B2 | 12/2006 | Schulte et al. |
| 2002/0194681 | A1 | 12/2002 | DeYoung et al. |
| 2003/0220219 | A1 | 11/2003 | Schulte et al. |
| 2004/0168262 | A1 | 9/2004 | Racette et al. |
| 2004/0173246 | A1 | 9/2004 | Damaso et al. |
| 2004/0231371 | A1 | 11/2004 | Scheper et al. |
| 2005/0044636 | A1 | 3/2005 | Galick et al. |
| 2006/0207035 | A1 | 9/2006 | Hayday |

FOREIGN PATENT DOCUMENTS

| | | |
|---|---|---|
| WO | 9401227 | 1/1994 |
| WO | 9615304 | 5/1996 |
| WO | 9738044 | 1/1997 |
| WO | 9948122 | 9/1999 |
| WO | 9949122 | 9/1999 |
| WO | 0050145 | 8/2000 |
| WO | 0056970 | 9/2000 |
| WO | 0106053 | 1/2001 |
| WO | 0129305 | 4/2001 |
| WO | 0129306 | 4/2001 |
| WO | 0286223 | 10/2002 |

OTHER PUBLICATIONS

EPA, A Citizen's Guide to Solvent Extraction, Apr. 1996, EPA 542–F–96–003.

International Search Report (PCT/US 02/12239) (Apr. 18, 2002).*

US 6,001,133, Dec. 1999, De Young et al. (withdrawn).*

* cited by examiner

CLEANING SYSTEM UTILIZING AN ORGANIC CLEANING SOLVENT AND A PRESSURIZED FLUID SOLVENT

Matter enclosed in heavy brackets [ ] appears in the original patent but forms no part of this reissue specification; matter printed in italics indicates the additions made by reissue.

This application is a [continuation] *continuation-in-part* of application Ser. No. 09/843,103 filed Apr. 25, 2001, now U.S. Pat. No. 6,558,432, *which is a continuation-in-part of application Ser. No. 09/419,345, filed Oct. 15, 1999, now U.S. Pat. No. 6,355,072.*

BACKGROUND

1. Field of the Invention

The present invention relates generally to cleaning systems, and more specifically to substrate cleaning systems, such as textile cleaning systems, utilizing an organic cleaning solvent and a pressurized fluid solvent.

2. Related Art

A variety of methods and systems are known for cleaning substrates such as textiles, as well as other flexible, precision, delicate, or porous structures that are sensitive to soluble and insoluble contaminants. These known methods and systems typically use water, perchloroethylene, petroleum, and other solvents that are liquid at or substantially near atmospheric pressure and room temperature for cleaning the substrate.

Such conventional methods and systems generally have been considered satisfactory for their intended purpose. Recently, however, the desirability of employing these conventional methods and systems has been questioned due to environmental, hygienic, occupational hazard, and waste disposal concerns, among other things. For example, perchloroethylene frequently is used as a solvent to clean delicate substrates, such as textiles, in a process referred to as "dry cleaning." Some locales require that the use and disposal of this solvent be regulated by environmental agencies, even when only trace amounts of this solvent are to be introduced into waste streams.

Furthermore, there are significant regulatory burdens placed on solvents such as perchloroethylene by agencies such as the EPA, OSHA and DOT. Such regulation results in increased costs to the user, which, in turn, are passed to the ultimate consumer. For example, filters that have been used in conventional perchloroethylene dry cleaning systems must be disposed of in accordance with hazardous waste or other environmental regulations. Certain other solvents used in dry cleaning, such as hydrocarbon solvents, are extremely flammable, resulting in greater occupational hazards to the user and increased costs to control their use.

In addition, textiles that have been cleaned using conventional cleaning methods are typically dried by circulating hot air through the textiles as they are tumbled in a drum. The solvent must have a relatively high vapor pressure and low boiling point to be used effectively in a system utilizing hot air drying. The heat used in drying may permanently set some stains in the textiles. Furthermore, the drying cycle adds significant time to the overall processing time. During the conventional drying process, moisture adsorbed on the textiles fibers is often removed in addition to the solvent. This often results in the development of undesirable static electricity and shrinkage in the garments. Also, the textiles are subject to greater wear due to the need to tumble the textiles in hot air for a relatively long time. Conventional drying methods are inefficient and often leave excess residual solvent in the textiles, particularly in heavy textiles, components constructed of multiple fabric layers, and structural components of garments such as shoulder pads. This may result in unpleasant odors and, in extreme cases, may cause irritation to the skin of the wearer. In addition to being time consuming and of limited efficiency, conventional drying results in significant loss of cleaning solvent in the form of fugitive solvent vapor. The heating required to evaporate combustible solvents in a conventional drying process increases the risk of fire and/or explosions. In many cases, heating the solvent will necessitate explosion-proof components and other expensive safety devices to minimize the risk of fire and explosions. Finally, conventional hot air drying is an energy intensive process that results in relatively high utility costs and accelerated equipment wear.

Traditional cleaning systems may utilize distillation in conjunction with filtration and adsorption to remove soils dissolved and suspended in the cleaning solvent. The filters and adsorptive materials become saturated with solvent, therefore, disposal of some filter waste is regulated by state or federal laws. Solvent evaporation especially during the drying cycle is one of the main sources of solvent loss in conventional systems. Reducing solvent loss improves the environmental and economic aspects of cleaning substrates using cleaning solvents. It is therefore advantageous to provide a method and system for cleaning substrates that utilizes a solvent having less adverse attributes than those solvents currently used and reduces solvent losses.

As an alternative to conventional cleaning solvents, pressurized fluid solvents or densified fluid solvents have been used for cleaning various substrates, wherein densified fluids are widely understood to encompass gases that are pressurized to either subcritical or supercritical conditions so as to achieve a liquid or a supercritical fluid having a density approaching that of a liquid. In particular, some patents have disclosed the use of a solvent such as carbon dioxide that is maintained in a liquid state or either a subcritical or supercritical condition for cleaning such substrates as textiles, as well as other flexible, precision, delicate, or porous structures that are sensitive to soluble and insoluble contaminants.

For example, U.S. Pat. No. 5,279,615 discloses a process for cleaning textiles using densified carbon dioxide in combination with a non-polar cleaning adjunct. The preferred adjuncts are paraffin oils such as mineral oil or petrolatum. These substances are a mixture of alkanes including a portion of which are $C_{16}$ or higher hydrocarbons. The process uses a heterogeneous cleaning system formed by the combination of the adjunct which is applied to the textile prior to or substantially at the same time as the application of the densified fluid. According to the data disclosed in U.S. Pat. No. 5,279,615, the cleaning adjunct is not as effective at removing soil from fabric as conventional cleaning solvents or as the solvents described for use in the present invention as disclosed below.

U.S. Pat. No. 5,316,591 discloses a process for cleaning substrates using liquid carbon dioxide or other liquefied gases below their critical temperature. The focus of this patent is on the use of any one of a number of means to effect cavitation to enhance the cleaning performance of the liquid carbon dioxide. In all of the disclosed embodiments, densified carbon dioxide is the cleaning medium. This patent does not describe the use of a solvent other than the liquefied gas for cleaning substrates. While the combination of ultrasonic cavitation and liquid carbon dioxide may be well suited to processing complex hardware and substrates containing extremely hazardous contaminants, this process is too costly for the regular cleaning of textile substrates. Furthermore, the use of ultrasonic cavitation is less effective for removing contaminants from textiles than it is for removing contaminants from hard surfaces.

U.S. Pat. No. 5,377,705, issued to Smith et al., discloses a system designed to clean parts utilizing supercritical carbon dioxide and an environmentally friendly co-solvent. Parts to be cleaned are placed in a cleaning vessel along with the co-solvent. After adding super critical carbon dioxide, mechanical agitation is applied via sonication or brushing. Loosened contaminants are then flushed from the cleaning vessel using additional carbon dioxide. Use of this system in the cleaning of textiles is neither suggested nor disclosed. Furthermore, use of this system for the cleaning of textiles would result in redeposition of loosened soil and damage to some fabrics.

U.S. Pat. No. 5,417,768, issued to Smith et al., discloses a process for precision cleaning of a work piece using a multi-solvent system in which one of the solvents is liquid or supercritical carbon dioxide. The process results in minimal mixing of the solvents and incorporates ultrasonic cavitation in such a way as to prevent the ultrasonic transducers from coming in contact with cleaning solvents that could degrade the piezoelectric transducers. Use of this system in the cleaning of textiles is neither suggested nor disclosed. In fact, its use in cleaning textiles would result in redeposition of loosened soil and damage to some fabrics.

U.S. Pat. No. 5,888,250 discloses the use of a binary azeotrope comprised of propylene glycol tertiary butyl ether and water as an environmentally attractive replacement for perchlorethylene in dry cleaning and degreasing processes. While the use of propylene glycol tertiary butyl ether is attractive from an environmental regulatory point of view, its use as disclosed in this invention is in a conventional dry cleaning process using conventional dry cleaning equipment and a conventional evaporative hot air drying cycle. As a result, it has many of the same disadvantages as conventional dry cleaning processes described above.

U.S. Pat. No. 6,200,352 discloses a process for cleaning substrates in a cleaning mixture comprising carbon dioxide, water, surfactant, and organic co-solvent. This process uses carbon dioxide as the primary cleaning media with the other components included to enhance the overall cleaning effectiveness of the process. There is no suggestion of a separate, low pressure cleaning step followed by the use of densified fluid to remove the cleaning solvent. As a result, this process has many of the same cost and cleaning performance disadvantages of other liquid carbon dioxide cleaning processes. Additional patents have been issued to the assignee of U.S. Pat. No. 6,200,352 covering related subject matter. All of these patents disclose processes in which liquid carbon dioxide is the cleaning solvent. Consequently, these processes have the same cost and cleaning performance disadvantages.

Several of the pressurized fluid solvent cleaning methods described in the above patents may lead to recontamination of the substrate and degradation of efficiency because the contaminated solvent is not continuously purified or removed from the system. Furthermore, pressurized fluid solvent alone is not as effective at removing some types of soil as are conventional cleaning solvents. Consequently, pressurized fluid solvent cleaning methods require individual treatment of stains and heavily soiled areas of textiles, which is a labor-intensive process. Furthermore, systems that utilize pressurized fluid solvents for cleaning are more expensive and complex to manufacture and maintain than conventional cleaning systems. Finally, few if any conventional surfactants can be used effectively in pressurized fluid solvents. The surfactants and additives that can be used in pressurized fluid solvent cleaning systems are much more expensive than those used in conventional cleaning systems.

There thus remains a need for an efficient and economic method and system for cleaning substrates that incorporates the benefits of prior systems, and minimizes the difficulties encountered with each. There also remains a need for a method and system in which the hot air drying time is eliminated, or at least reduced, thereby reducing the wear on the substrate and preventing stains from being permanently set on the substrate.

SUMMARY

In the present invention, certain types of organic solvents, such as terpenes, halohydrocarbons, certain glycol ethers, polyols, ethers, esters of glycol ethers, esters of fatty acids and other long chain carboxylic acids, fatty alcohols and other long-chain alcohols, short-chain alcohols, polar aprotic solvents, siloxanes, hydrofluoroethers, dibasic esters, and aliphatic hydrocarbons solvents or similar solvents or mixtures of such solvents are used in cleaning substrates. Any type of organic solvent that falls within the chemical formulae disclosed hereinafter may be used to clean substrates. However, unlike conventional cleaning systems, in the present invention, a conventional drying cycle is not performed. Instead, the system utilizes the solubility of the organic solvent in pressurized fluid solvents, as well as the physical properties of pressurized fluid solvents, to dry the substrate being cleaned.

As used herein, the term "pressurized fluid solvent" refers to both pressurized liquid solvents and densified fluid solvents. The term "pressurized liquid solvent" as used herein refers to solvents that are preferably liquid at between approximately 600 and 1050 pounds per square inch and between approximately 5 and 30 degrees Celsius, but are gas at atmospheric pressure and room temperature. The term "densified fluid solvent" as used herein refers to a gas or gas mixture that is compressed to either subcritical or supercritical conditions so as to achieve either a liquid or a supercritical fluid having density approaching that of a liquid. Preferably, the pressurized fluid solvent used in the present invention is an inorganic substance such as carbon dioxide, xenon, nitrous oxide, or sulfur hexafluoride. Most preferably, the pressurized fluid solvent is densified carbon dioxide.

The substrates are cleaned in a perforated drum within a vessel in a cleaning cycle using an organic solvent. A perforated drum is preferred to allow for free interchange of solvent between the drum and vessel as well as to transport soil from the substrates to the filter. After substrates have been cleaned in the perforated drum, the organic solvent is extracted from the substrates by rotating the cleaning drum at high speed within the cleaning vessel in the same way conventional solvents are extracted from substrates in conventional cleaning machines. However, instead of proceeding to a conventional evaporative hot air drying cycle, the substrates are immersed in pressurized fluid solvent to extract the residual organic solvent from the substrates. This is possible because the organic solvent is soluble in the pressurized fluid solvent. After the substrates are immersed in pressurized fluid solvent, the pressurized fluid solvent is transferred from the drum. Finally, the vessel is de-pressurized to atmospheric pressure to evaporate any remaining pressurized fluid solvent, yielding clean, solvent-free substrates.

The solvents used in the present invention tend to be soluble in pressurized fluid solvents such as supercritical or subcritical carbon dioxide so that a conventional hot air drying cycle is not necessary. The types of solvents used in conventional cleaning systems must have reasonably high vapor pressures and low boiling points because they must be removed from the substrates by evaporation in a stream of hot air. However, solvents that have a high vapor pressure and a low boiling point generally also have a low flash point. From a safety standpoint, organic solvents used in cleaning substrates should have a flash point that is as high as possible, or preferably, it should have no flash point. By eliminating the conventional hot air evaporative drying process, a wide range of solvents can be used in the present invention that have much lower evaporation rates, higher boiling points and higher flash points than those used in conventional cleaning systems. For situations where the desired solvent has a relatively low flash point, the elimination of the hot air evaporative drying cycle significantly increases the level of safety with respect to fire and explosions.

Thus, the cleaning system described herein utilizes solvents that are less regulated and less combustible, and that efficiently remove different soil types typically deposited on textiles through normal use. The cleaning system reduces solvent consumption and waste generation as compared to conventional dry cleaning systems. Machine and operating costs are reduced as compared to currently used pressurized fluid solvent systems, and conventional additives may be used in the cleaning system.

Furthermore, one of the main sources of solvent loss from conventional dry cleaning systems, which occurs in the evaporative hot air drying step, is eliminated altogether. Because the conventional evaporative hot air drying process is eliminated, there are no heat set stains on the substrates, risk of fire and/or explosion is reduced, the total cycle time is reduced, and residual solvent in the substrates is substantially reduced or eliminated. Substrates are also subject to less wear, less static electricity build-up and less shrinkage because there is no need to tumble the substrates in a stream of hot air to dry them.

While systems according to the present invention utilizing pressurized fluid solvent to remove organic solvent can be constructed as wholly new systems, existing conventional solvent systems can also be converted to utilize the present invention. An existing conventional solvent system can be used to clean substrates with organic solvent, and an additional pressurized chamber for drying substrates with pressurized fluid solvent can be added to the existing system.

Therefore, according to the present invention, textiles to be cleaned are placed in a cleaning drum within a cleaning vessel, adding an organic solvent to the cleaning vessel, cleaning the textiles with the organic solvent, removing a portion of the organic solvent from the cleaning vessel, rotating the cleaning drum to extract a portion of the organic solvent from the textiles, placing the textiles into a drying drum within a pressurized drying vessel, adding a pressurized fluid solvent to the drying vessel, removing a portion of the pressurized fluid solvent from the drying vessel, rotating the drying drum to extract a portion of the pressurized fluid solvent from the textiles, depressurizing the drying vessel to remove the remainder of the pressurized fluid solvent by evaporation, and removing the textiles from the depressurized vessel.

These and other features and advantages of the invention will be apparent upon consideration of the following detailed description of the presently preferred embodiment of the invention, taken in conjunction with the claims and appended drawings, as well as will be learned by practice of the invention.

DETAILED DESCRIPTION

Reference will now be made in detail to embodiments of the invention, examples of which are illustrated in the accompanying drawings. The steps of each method for cleaning and drying a substrate will be described in conjunction with the detailed description of the system.

Figure 1:
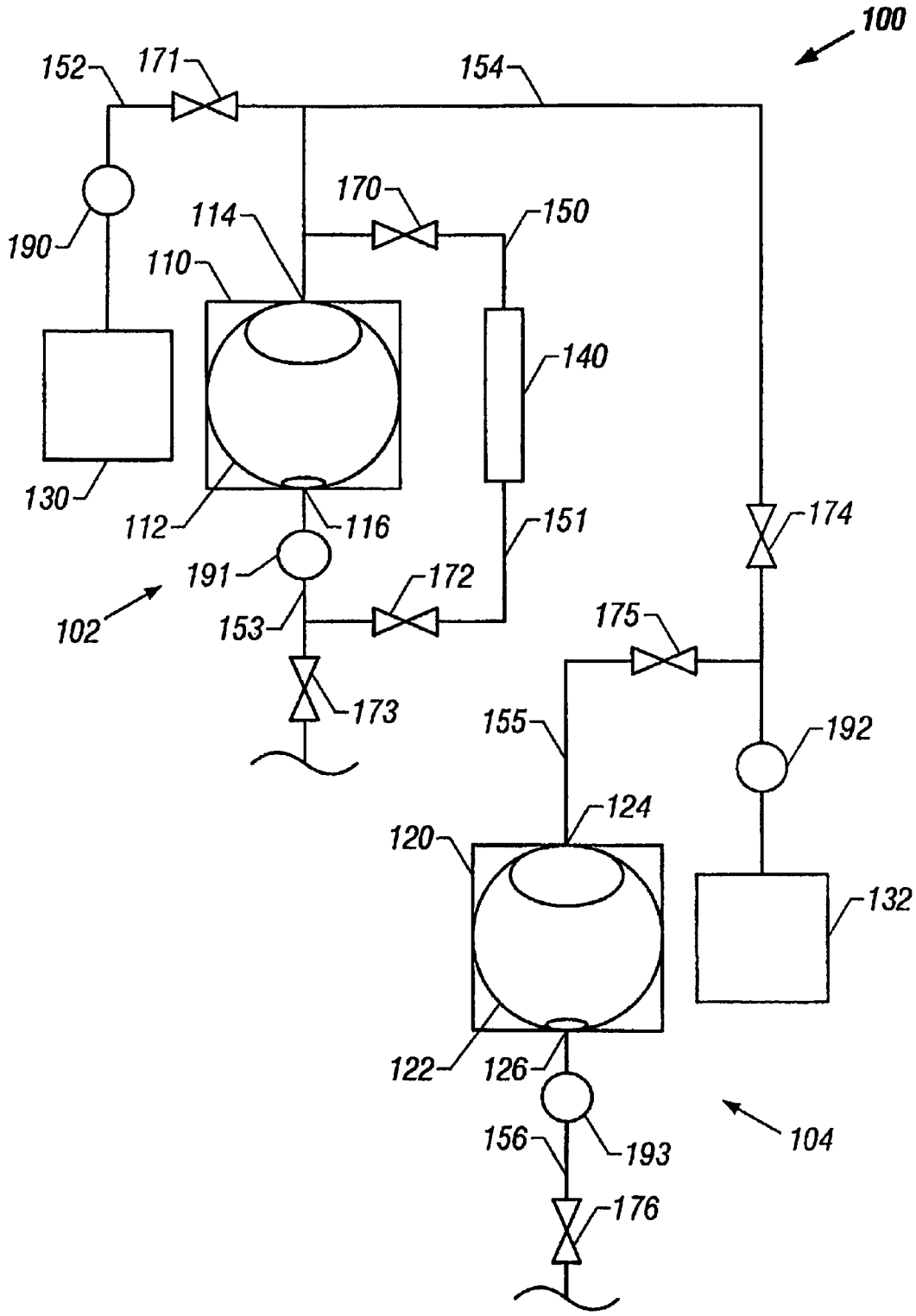
FIG. 1 is a block diagram of a cleaning system utilizing separate vessels for cleaning and drying.
Figure 2:
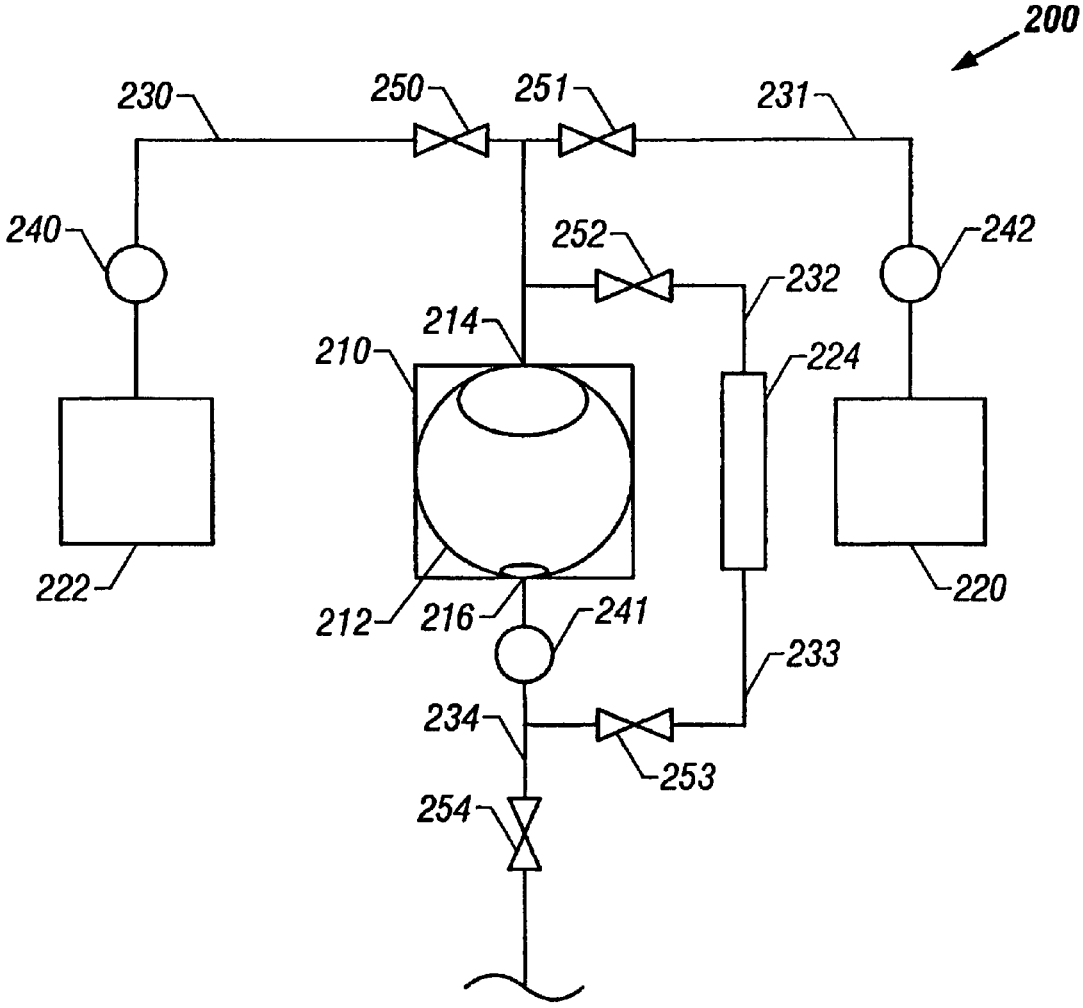
FIG. 2 is a block diagram of a cleaning system utilizing a single vessel for cleaning and drying.

The methods and systems presented herein may be used for cleaning a variety of substrates. The present invention is particularly suited for cleaning substrates such as textiles, as well as other flexible, precision, delicate, or porous structures that are sensitive to soluble and insoluble contaminants. The term "textile" is inclusive of, but not limited to, woven or non-woven materials, as well as articles made therefrom. Textiles include, but are not limited to, fabrics, articles of clothing, protective covers, carpets, upholstery, furniture and window treatments. For purposes of explanation and illustration, and not limitation, exemplary embodiments of a system for cleaning textiles in accordance with the invention are shown in FIGS. 1 and 2.

As noted above, the pressurized fluid solvent used in the present invention is either a pressurized liquid solvent or a densified fluid solvent. Although a variety of solvents may be used, it is preferred that an inorganic substance such as carbon dioxide, xenon, nitrous oxide, or sulfur hexafluoride, be used as the pressurized fluid solvent. For cost and environmental reasons, liquid, supercritical, or subcritical carbon dioxide is the preferred pressurized fluid solvent.

Furthermore, to maintain the pressurized fluid solvent in the appropriate fluid state, the internal temperature and pressure of the system must be appropriately controlled relative to the critical temperature and pressure of the pressurized fluid solvent. For example, the critical temperature and pressure of carbon dioxide is approximately 31 degrees Celsius and approximately 73 atmospheres, respectively. The temperature may be established and regulated in a conventional manner, such as by using a heat exchanger in combination with a thermocouple or similar regulator to control temperature. Likewise, pressurization of the system may be performed using a pressure regulator and a pump and/or compressor in combination with a pressure gauge. These components are conventional and are not shown in FIGS. 1 and 2 as placement and operation of these components are known in the art.

The system temperature and pressure may be monitored and controlled either manually, or by a conventional automated controller (which may include, for example, an appropriately programmed computer or appropriately constructed microchip) that receives signals from the thermocouple and pressure gauge, and then sends corresponding signals to the heat exchanger and pump and/or compressor, respectively.

Unless otherwise noted, the temperature and pressure is appropriately maintained throughout the system during operation. As such, elements contained within the system are constructed of sufficient size and material to withstand the temperature, pressure, and flow parameters required for operation, and may be selected from, or designed using, any of a variety of presently available high pressure hardware.

In the present invention, the preferred organic solvent should have a flash point of greater than 100 F to allow for increased safety and less governmental regulation, have a low evaporation rate to minimize fugitive emissions, be able to remove soils consisting of insoluble particulate soils and solvent soluble oils and greases, and prevent or reduce redeposition of soil onto the textiles being cleaned.

Preferably, the organic solvents suitable for use in the present invention include any of the following alone or in combination. A description of the chemical formulae of the organic solvents that can be used in the cleaning processes of the invention follows. As used herein, elemental designations are the same as used by one of skill in the relevant art. For example, as used herein, H designates hydrogen, O designates oxygen, C designates carbon, S designates sulfur, $CH_3$ designates methyl, $CH_2CH_3$ designates ethyl, and so forth. R is a variable that designates a chemical structure as described further herein.

In one embodiment of the invention, the organic solvent of the invention is composed, at least in part, of a chemical having the following general chemical structure:

$$C_aX_jH_kO_z$$

wherein:

a=5n and 1≦n≦3;

each X is independently F, Cl, Br or I;

0≦z≦4;

0≦j, k≦10; and

0≦(j+k)≦10n.

In another embodiment of the invention, the organic solvent of the invention is composed, at least in part, of a chemical having the following general chemical structure:

$$C_nX_jH_k$$

wherein:

1≦n≦20;

each X is independently F, Cl, Br or I;

0≦j;

k≦2n+2; and

2n−4≦(+k)≦2n+2.

In another embodiment of the invention, the organic solvent of the invention is composed, at least in part, of a chemical having the one of the following general chemical structures:

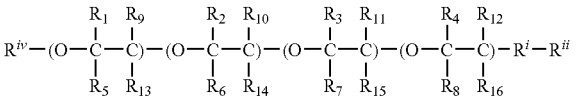

wherein:

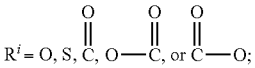

$R^{iv}=C_jH_uX_v$;

$R^{ii}=C_kH_yX_z$ or benzyl, phenyl, partially or fully fluorinated benzyl or phenyl;

0≦u, v≦2j+1;

0≦(u+v)≦2j+1;

0≦y, z≦2k+1;

0<(y+z)≦2k+1;

0≦u, v, y, z≦37;

$R_{1-4}$ and $R_{9-12}$ are independently $C_mH_nX_p$, where 0≦m≦2;

0≦(n+p)≦5; and n+p=2m+1;

$R_{5-8}$ and $R_{13-16}$ are independently $C_aH_bX_d$, wherein a is 0 or 1;

0≦(b+d)≦3; and b+d=2a+1; and each X is independently F, Cl, Br or I or

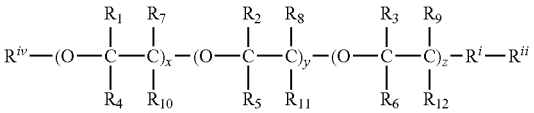

wherein:

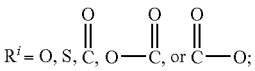

$R^{iv}=C_jH_uX_v$;

$R^{ii}=C_kH_yX_z$ or benzyl, phenyl, partially or fully fluorinated benzyl or phenyl;

j and k each equal 0 independently or

14−3(x+y+z)≦j, k≦22−3(x+y+z) and

14−3(x+y+z)≦(j+k)≦22−3(x+y+z);

0≦x, y, z≦1;

0≦(x+y+z)≦3;

0≦u, v, y, z≦37;

0≦(u+v)≦2j+1;

0≦(y+z)≦2k+1;

$R_{1-3}$ and $R_{7-9}$ are independently $C_mH_nX_p$, where 0≦m≦2;

0≦(n+p)≦5; and n+p=2 m+1;

$R_{4-6}$ and $R_{10-12}$ are independently $C_aH_bX_d$, wherein a is 0 or 1;

0≦(b+d)≦3; and b+d=2a+1; and each X is independently F, Cl, Br or I.

In another embodiment of the invention, the organic solvent of the invention is composed, at least in part, of a chemical having the following general chemical structure:

$$C_nH_jX_k(OR)_r$$

wherein:

each X is independently F, Cl, Br or I;

$1 \leqq n \leqq 20$;

$0 \leqq r \leqq 4$;

$0 \leqq j, k \leqq 2n+2-r$; and $2n-4-r \leqq (j+k) \leqq 2n+2-r$.

In another embodiment of the invention, the organic solvent of the invention is composed, at least in part, of a chemical having the following general chemical structure:

$$C_nH_jX_kO_b$$

wherein:

each X is independently F, Cl, Br or I;

$2 \leqq n \leqq 20$;

$0 \leqq j, k \leqq 2n+2$;

$2n-4 \leqq (j+k) \leqq 2n+2$; and $1 \leqq b \leqq 6$.

In another embodiment of the invention, the organic solvent of the invention is composed, at least in part, of a chemical having the one of the following general chemical structures:

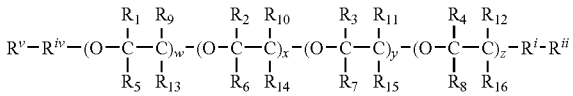

wherein:

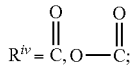

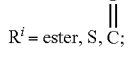

$R^{iv}=C_jH_uX_v$;

$R^{ii}=C_kH_aX_b$;

$15 \leqq j, k \leqq 32-3(w+x+y+z)$;

$15 \leqq j+k \leqq 32-3(w+x+y+z)$ $0 \leqq u, v \leqq 2j+1$;

$0 \leqq a$;

$b<2k+1$;

$2j-7 \leqq (u+v) \leqq 2j+1$;

$2k-7 \leqq (y+z) \leqq 2k+1$; and $R_{1-4}$ and $R_{9-12}$ are independently $C_mH_nX_p$, where $0 \leqq m \leqq 2$;

$0 \leqq (n+p) \leqq 5$; and $n+p=2m+1$;

$R_{5-8}$ and $R_{13-16}$ are independently $C_aH_bX_d$, wherein a is 0 or 1;

$0 \leqq (b+d) \leqq 3$; and $b+d=2a+1$; and each X is independently F, Cl, Br or I.

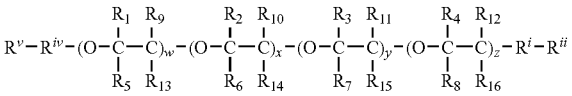

wherein:

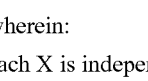

$R^{iv}=C_jH_uX_v$;

$R^{v}=C_jH_uX_v$;

$R^{ii}=C_kH_aX_b$;

$15 \leqq j, k \leqq 32-3(w+x+y+z)$;

$15 \leqq j+k \leqq 32-3(w+x+y+z)$;

$0 \leqq u, v \leqq 2j+1$;

$0 \leqq a$;

$b \leqq 2k+1$;

$2j-7 \leqq (u+v) \leqq 2j+1$;

$2k-7 \leqq (y+z) \leqq 2k+1$; and $R_{14}$ and $R_{9-12}$ are independently $C_mH_nX_p$, wherein $0<m<2$;

$0 \leqq (n+p) \leqq 5$; and $n+p=2m+1$;

$R_{5-8}$ and $R_{13-16}$ are independently $C_aH_bX_d$, wherein a is 0 or 1;

$0 \leqq (b+d) \leqq 3$; and $b+d=2a+1$; and each X is independently F, Cl, Br or I.

In another embodiment of the invention, the organic solvent of the invention is composed, at least in part, of a chemical having the following general chemical structure:

$$C_n(CO_2)_mH_aX_b$$

wherein:

each X is independently F, Cl, Br or I;

$2 \leqq n \leqq 21$;

$1 \leqq m \leqq 3$;

$0 \leqq a$;

$b \leqq 2n+2$; and $2n-2 \leqq (a+b) \leqq 2n+z$.

In another embodiment of the invention, the organic solvent of the invention is composed, at least in part, of a chemical having the one of the following general chemical structures:

$$C_n(CO_3)_mH_aX_b$$

wherein:

each X is independently F, Cl, Br or I;

$2 \leqq n \leqq 18$;

$m=1$;

$0 \leqq a$;

$b \leqq 2n+2$; and $2n-4 \leqq (a+b) \leqq 2n+z$.

or

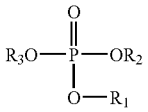

wherein:

$R_l = C_j H_a X_b$ $1 \leqq j \leqq 6$ $0 \leqq a$;

$b \leqq 2j+1$; and $2j-7 \leqq (a+b) \leqq 2j+1$;

$R_2 = C_k H_d X_e$ $1 \leqq k \leqq 6$;

$0 \leqq d$;

$e \leqq 2k+1$; and $d+e=2k+1$;

$R_3 = C_m H_e X_f$ $1 \leqq m \leqq 6$;

$0 \leqq e$;

$f \leqq 2m+1$; and $e+f=2m+1$; and each X is independently F, Cl, Br or I.

or $$SO_r C_n H_j X_k$$

wherein:

each X is independently F, Cl, Br or I;

$1 \leqq e \leqq 2$;

$2 \leqq n \leqq 8$;

$0 \leqq j$;

$k \leqq 2a+1$; and $2n \leqq (j+k) \leqq 2n+1$ or $$C_n H_y N_a O_b$$

wherein:

$1 \leqq n \leqq 10$;

$1 \leqq a$;

$b \leqq 2$ and $a=b$; and $2n-1 \leqq y \leqq 2n+1$.

In another embodiment of the invention, the organic solvent of the invention is composed, at least in part, of a chemical having the one of the following general chemical structures:

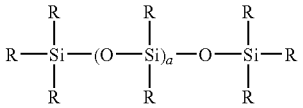

wherein:

each R equals $C_a X_y H_z$ independently;

each X is independently F, Cl, Br or I;

$1 \leqq a \leqq 3$; and $0 \leqq y, z \leqq 2a+1$ and $y+z=2a+1$.

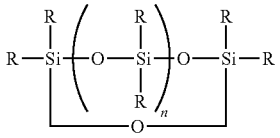

wherein:

$2 \leqq n \leqq 4$;

each R equals $C_a H_y X_z$ independently;

each X is independently F, Cl, Br or I;

$1 \leqq a \leqq 3$ $0 \leqq y$;

$z \leqq 2a+1$ and $y+z=2a+1$.

Referring now to FIG. 1, a block diagram of a cleaning system having separate vessels for cleaning and drying textiles is shown. The cleaning system 100 generally comprises a cleaning machine 102 having a cleaning vessel 110 operatively connected to, via one or more motor activated shafts (not shown), a perforated rotatable cleaning drum or wheel 112 within the cleaning vessel 110 with an inlet 114 to the cleaning vessel 110 and an outlet 116 from the cleaning vessel 110 through which cleaning fluids can pass. A drying machine 104 has a drying vessel 120 capable of being pressurized. The pressurizable drying vessel 120 is operatively connected to, via one or more motor activated shafts (not shown), a perforated rotatable drying drum or wheel 122 within the drying vessel 120 with an inlet 124 to the drying vessel 120 and an outlet 126 from the drying vessel 120 through which pressurized fluid solvent can pass. The cleaning vessel 110 and the drying vessel 120 can either be parts of the same machine, or they can comprise separate machines. Furthermore, both the cleaning and drying steps of this invention can be performed in the same vessel, as is described with respect to FIG. 2 below.

An organic solvent tank 130 holds any suitable organic solvent, as previously described, to be introduced to the cleaning vessel 110 through the inlet 114. A pressurized fluid solvent tank 132 holds pressurized fluid solvent to be added to the pressurizable drying vessel 120 through the inlet 124. Filtration assembly 140 contains one or more filters that continuously remove contaminants from the organic solvent from the cleaning vessel 110 as cleaning occurs.

The components of the cleaning system 100 are connected with line 150–156, which transfer organic solvents and vaporized and pressurized fluid solvents between components of the system. The term "line" as used herein is understood to refer to a piping network or similar conduit capable of conveying fluid and, for certain purposes, is capable of being pressurized. The transfer of the organic solvents and vaporized and pressurized fluid solvents through the line 150–156 is directed by valves 170–176 and pumps 190–193. While pumps 190–193 are shown in the described embodiment, any method of transferring liquid and/or vapor between components can be used, such as adding pressure to the component using a compressor to force the liquid and/or vapor from the component.

The textiles are cleaned with an organic solvent such as those previously described or mixtures thereof. The textiles may also be cleaned with a combination of organic solvent and pressurized fluid solvent, and this combination may be in varying proportions from about 50% by weight to 100% by weight of organic solvent and 0% by weight to 50% by weight of pressurized fluid solvent. In the cleaning process, the textiles are first sorted as necessary to place the textiles into groups suitable to be cleaned together. The textiles may then be spot treated as necessary to remove any stains that may not be removed during the cleaning process. The textiles are then placed into the cleaning drum 112 of the cleaning system 100. It is preferred that the cleaning drum 112 be perforated to allow for free interchange of solvent between the cleaning drum 112 and the cleaning vessel 110 as well as to transport soil from the textiles to the filtration assembly 140.

After the textiles are placed in the cleaning drum 112, an organic solvent contained in the organic solvent tank 130 is added to the cleaning vessel 110 via line 152 by opening valve 171, closing valves 170, 172, 173 and 174, and activating pump 190 to pump organic solvent through the inlet 114 of the cleaning vessel 110. The organic solvent may contain one or more co-solvents, water, detergents, or other additives to enhance the cleaning capability of the cleaning system 100. Alternatively, one or more additives may be added directly to the cleaning vessel 110. Pressurized fluid solvent may also be added to the cleaning vessel 110 along with the organic solvent to enhance cleaning. Pressurized fluid solvent can be added to the cleaning vessel 110 via line 154 by opening valve 174, closing valves 170, 171, 172, 173, and 175, and activating pump 192 to pump pressurized fluid solvent through the inlet 114 of the cleaning vessel 110. Of course, if pressurized fluid solvent is included in the cleaning cycle, the cleaning vessel 110 will need to be pressurized in the same manner as the drying vessel 120, as discussed below.

When a sufficient amount of the organic solvent, or combination of organic solvent and pressurized fluid solvent, is added to the cleaning vessel 110, the motor (not shown) is activated and the perforated cleaning drum 112 is agitated and/or rotated within cleaning vessel 110. During this phase, the organic solvent is continuously cycled through the filtration assembly 140 by opening valves 170 and 172, closing valves 171, 173 and 174, and activating pump 191. Filtration assembly 140 may include one or more fine mesh filters to remove particulate contaminants from the organic solvent passing therethrough and may alternatively or in addition include one or more absorptive or adsorptive filters to remove water, dyes and other dissolved contaminants from the organic solvent. Exemplary configurations for filter assemblies that can be used to remove contaminants from either the organic solvent or the pressurized fluid solvent are described more fully in U.S. application Ser. No. 08/994,583 incorporated herein by reference. As a result, the organic solvent is pumped through outlet 116, valve 172, line 151, filter assembly 140, line 150, valve 170 and re-enters the cleaning vessel 110 via inlet 114. This cycling advantageously removes contaminants, including particulate contaminants and/or soluble contaminants, from the organic solvent and reintroduces filtered organic solvent to the cleaning vessel 110 and agitating or rotating cleaning drum 112. Through this process, contaminants are removed from the textiles. Of course, in the event the cleaning vessel 110 is pressurized, this recirculation system will be maintained at the same pressure/temperature levels as those in cleaning vessel 110.

After sufficient time has passed so that the desired level of contaminants is removed from the textiles and organic solvent, the organic solvent is removed from the cleaning drum 112 and cleaning vessel 110 by opening valve 173, closing valves 170, 171, 172 and 174, and activating pump 191 to pump the organic solvent through outlet 116 via line 153. The cleaning drum 112 is then rotated at a high speed, such as 400–800 rpm, to further remove organic solvent from the textiles. The cleaning drum 112 is preferably perforated so that, when the textiles are rotated in the cleaning drum 112 at a high speed, the organic solvent can drain from the cleaning drum 112. Any organic solvent removed from the textiles by rotating the cleaning drum 112 at high speed is also removed from the cleaning drum 112 in the manner described above. After the organic solvent is removed from the cleaning drum 112, it can either be discarded or recovered and decontaminated for reuse using solvent recovery systems known in the art. Furthermore, multiple cleaning cycles can be used if desired, with each cleaning cycle using the same organic solvent or different organic solvents. If multiple cleaning cycles are used, each cleaning cycle can occur in the same cleaning vessel, or a separate cleaning vessel can be used for each cleaning cycle.

After a desired amount of the organic solvent is removed from the textiles by rotating the cleaning drum 112 at high speed, the textiles are moved from the cleaning drum 112 to the drying drum 122 within the drying vessel 120 in the same manner textiles are moved between machines in conventional cleaning systems. In an alternate embodiment, a single drum can be used in both the cleaning cycle and the drying, cycle, so that, rather than transferring the textiles between the cleaning drum 112 and the drying drum 122, a single drum containing the textiles is transferred between the cleaning vessel 110 and the drying vessel 120. If the cleaning vessel 110 is pressurized during the cleaning cycle, it must be depressurized before the textiles are removed. Once the textiles have been placed in the drying drum 122, pressurized fluid solvent, such as that contained in the carbon dioxide tank 132, is added to the drying vessel 120 via lines 154 and 155 by opening valve 175, closing valves 174 and 176, and activating pump 192 to pump pressurized fluid solvent through the inlet 124 of the drying vessel 120 via lines 154 and 155. When pressurized fluid solvent is added to the drying vessel 120, the organic solvent remaining on the textiles dissolves in the pressurized fluid solvent.

After a sufficient amount of pressurized fluid solvent is added so that the desired level of organic solvent has been dissolved, the pressurized fluid solvent and organic solvent combination is removed from the drying vessel 120, and therefore also from the drying drum 122, by opening valve 176, closing valve 175 and activating pump 193 to pump the pressurized fluid solvent and organic solvent combination through outlet 126 via line 156. If desired, this process may be repeated to remove additional organic solvent. The drying drum 122 is then rotated at a high speed, such as 150–800 rpm, to further remove the pressurized fluid solvent and organic solvent combination from the textiles. The drying drum 122 is preferably perforated so that, when the textiles are rotated in the drying drum 122 at a high speed, the pressurized fluid solvent and organic solvent combination can drain from the drying drum 122. Any pressurized fluid solvent and organic solvent combination removed from the textiles by spinning the drying drum 122 at high speed is also pumped from the drying vessel 120 in the manner described above. After the pressurized fluid solvent and organic solvent combination is removed from the drying vessel 120, it can either be discarded or separated and recovered for reuse with solvent recovery systems known in the art. Note that, while preferred, it is not necessary to include a high speed spin cycle to remove pressurized fluid solvent from the textiles.

After a desired amount of the pressurized fluid solvent is removed from the textiles by rotating the drying drum 122, the drying vessel 120 is pressurized over a period of about 5–15 minutes. The depressurization of the drying vessel 120 vaporizes any remaining pressurized fluid solvent, leaving dry, solvent-free textiles in the drying drum 122. The pressurized fluid solvent that has been vaporized is then removed from the drying vessel 120 by opening valve 176, closing valve 175, and activating pump 193. As a result, the vaporized pressurized fluid solvent is pumped through the outlet 126, line 156 and valve 176, where it can then either be vented to the atmosphere or recovered and recompressed for reuse.

While the cleaning system 100 has been described as a complete system, an existing conventional dry cleaning system can be converted for use in accordance with the present invention. To convert a conventional dry cleaning system, the organic solvent described above is used to clean textiles in the conventional system. A separate pressurized vessel is added to the conventional system for drying the textiles with pressurized fluid solvent. Thus, the conventional system is converted for use with a pressurized fluid solvent. For example, the system in FIG. 1 could represent such a converted system, wherein the components of the cleaning machine 102 are conventional, and the pressurized fluid solvent tank 132 is not in communication with the cleaning vessel 100. In such a situation, the drying machine 104 is the add-on part of the conventional cleaning machine.

Furthermore, while the system shown in FIG. 1 comprises a single cleaning vessel, multiple cleaning vessels could be used, so that the textiles are subjected to multiple cleaning steps, with each cleaning step carried out in a different cleaning vessel using the same or different organic solvents in each step. The description of the single cleaning vessel is merely for purposes of description and should not be construed as limiting the scope of the invention.

Referring now to FIG. 2, a block diagram of an alternate embodiment of the present invention, a cleaning system having a single chamber for cleaning and drying the textiles, is shown. The cleaning system 200 generally comprises a cleaning machine having a pressurizable vessel 210. The vessel 210 is operatively connected to, via one or more motor activated shafts (not shown), a perforated rotatable drum or wheel 212 within the vessel 210 with an inlet 214 to the vessel 210 and an outlet 216 from the vessel 210 through which dry cleaning fluids can pass.

An organic solvent tank 220 holds any suitable organic solvent, such as those described above, to be introduced to the vessel 210 through the inlet 214. A pressurized fluid solvent tank 222 holds pressurized fluid solvent to be added to the vessel 210 through the inlet 214. Filtration assembly 224 contains one or more filters than continuously remove contaminants from the organic solvent from the vessel 210 and drum 212 as cleaning occurs.

The components of the cleaning system 200 are connected with line 230–234 that transfer organic solvents and vaporized and pressurized fluid solvent between components of the system. The term "line" as used herein is understood to refer to a piping network or similar conduit capable of conveying fluid and, for certain purposes, is capable of being pressurized. The transfer of the organic solvents and vaporized and pressurized fluid solvent through the line 230–234 is directed by valves 250–254 and pumps 240–242. While pumps 240–242 are shown in the described embodiment, any method of transferring liquid and/or vapor between components can be used, such as adding pressure to the component using a compressor to force the liquid and/or vapor from the component.

The textiles are cleaned with an organic solvent such as those previously described. The textiles may also be cleaned with a combination of organic solvent and pressurized fluid solvent, and this combination may be in varying proportions of 50–100% by weight organic solvent and 0–50% by weight pressurized fluid solvent. In the cleaning process, the textiles are first sorted as necessary to place the textiles into groups suitable to be cleaned together. The textiles may then be spot treated as necessary to remove any stains that may not be removed during the cleaning process. The textiles are then placed into the drum 212 within the vessel 210 of the cleaning system 200. It is preferred that the drum 212 be perforated to allow for free interchange of solvent between the drum 212 and the vessel 210 as well as to transport soil from the textiles to the filtration assembly 224.

After the textiles are placed in the drum 212, an organic solvent contained in the organic solvent tank 220 is added to the vessel 210 via line 231 by opening valve 251, closing valves 250, 252, 253 and 254, and activating pump 242 to pump organic solvent through the inlet 214 of the vessel 210. The organic solvent may contain one or more co-solvents, detergents, water, or other additives to enhance the cleaning capability of the cleaning system 200 or other additives to impart other desirable attributes to the articles being treated. Alternatively, one or more additives may be added directly to the vessel. Pressurized fluid solvent may also be added to the vessel 210 along with the organic solvent to enhance cleaning. The pressurized fluid solvent is added to the vessel 210 via line 230 by opening valve 250, closing valves 251, 252, 253 and 254, and activating pump 240 to pump the pressurized fluid solvent through the inlet 214 of the vessel 210.

When the desired amount of the organic solvent, or combination of organic solvent and pressurized fluid solvent as described above, is added to the vessel 210, the motor (not shown) is activated and the drum 212 is agitated and/or rotated. During this phase, the organic solvent, as well as pressurized fluid solvent if used in combination, is continuously cycled through the filtration assembly 224 by opening valves 252 and 253, closing valves 250, 251 and 254, and activating pump 241. Filtration assembly 224 may include one or more fine mesh filters to remove particulate contaminants from the organic solvent and pressurized fluid solvent passing therethrough and may alternatively or in addition include one or more absorptive or adsorptive filters to remove water, dyes, and other dissolved contaminants from the organic solvent. Exemplary configurations for filter assemblies that can be used to remove contaminants from either the organic solvent or the pressurized fluid solvent are described more fully in U.S. application Ser. No. 08/994,583 incorporated herein by reference. As a result, the organic solvent is pumped through outlet 216, valve 253, line 233, filter assembly 224, line 232, valve 252 and reenters the vessel 210 via inlet 214. This cycling advantageously removes contaminants, including particulate contaminants and/or soluble contaminants, from the organic solvent and pressurized fluid solvent and reintroduces filtered solvent to the vessel 210. Through this process, contaminants are removed from the textiles.

After sufficient time has passed so that the desired level of contaminants is removed from the textiles and solvents, the organic solvent is removed from the vessel 210 and drum 212 by opening valve 254, closing valves 250, 251, 252 and 253, and activating pump 241 to pump the organic solvent through outlet 216 and line 234. If pressurized fluid solvent is used in combination with organic solvent, it may be necessary to first separate the pressurized fluid solvent from the organic solvent. The organic solvent can then either be discarded or, preferably, contaminants may be removed from the organic solvent and the organic solvent recovered for further use. Contaminants may be removed from the organic solvent with solvent recovery systems known in the art. The drum 212 is then rotated at a high speed, such as 150–800 rpm, to further remove organic solvent from the textiles. The drum 212 is preferably perforated so that, when the textiles are rotated in the drum 212 at a high speed, the organic solvent can drain from the cleaning drum 212. Any organic solvent removed from the textiles by rotating the drum 212 at high speed can also either be discarded or recovered for further use.

After a desired amount of organic solvent is removed from the textiles by rotating the drum 212, pressurized fluid solvent contained in the pressurized fluid tank 222 is added to the vessel 210 by opening valve 250, closing valves 251, 252, 253 and 254, and activating pump 240 to pump pressurized fluid solvent through the inlet 214 of the pressurizable vessel 210 via line 230. When pressurized fluid solvent is added to the vessel 210, organic solvent remaining on the textiles dissolves in the pressurized fluid solvent.

After a sufficient amount of pressurized fluid solvent is added so that the desired level of organic solvent has been dissolved, the pressurized fluid solvent and organic solvent combination is removed from the vessel 210 by opening valve 254, closing valves 250, 251, 252 and 253, and activating pump 241 to pump the pressurized fluid solvent and organic solvent combination through outlet 216 and line 234. Note that pump 241 may actually require two pumps, one for pumping the low pressure organic solvent in the cleaning cycle and one for pumping the pressurized fluid solvent in the drying cycle.

The pressurized fluid solvent and organic solvent combination can then either be discarded or the combination may be separated and the organic solvent and pressurized fluid solvent separately recovered for further use. The drum 212 is then rotated at a high speed, such as 150–350 rpm, to further remove pressurized fluid solvent and organic solvent combination from the textiles. Any pressurized fluid solvent and organic solvent combination removed from the textiles by spinning the drum 212 at high speed can also either be discarded or retained for further use. Note that, while preferred, it is not necessary to include a high speed spin cycle to remove pressurized fluid solvent from the textiles.

After a desired amount of the pressurized fluid solvent is removed from the textiles by rotating the drum 212, the vessel 210 is depressurized over a period of about 5–15 minutes. The depressurization of the vessel 210 vaporizes the pressurized fluid solvent, leaving dry, solvent-free textiles in the drum 212. The pressurized fluid solvent that has been vaporized is then removed from the vessel 210 by opening valve 254, closing valves 250, 251, 252 and 253, and activating pump 241 to pump the vaporized pressurized fluid solvent through outlet 216 and line 234. Note that while a single pump is shown as pump 241, separate pumps may be necessary to pump organic solvent, pressurized fluid solvent and pressurized fluid solvent vapors, at pump 241. The remaining vaporized pressurized fluid solvent can then either be vented into the atmosphere or compressed back into pressurized fluid solvent for further use.

As discussed above, terpenes, halohydrocarbons, certain glycol ethers, polyols, ethers, esters of glycol ethers, esters of fatty acids and other long chain carboxylic acids, fatty alcohols and other long-chain alcohols, short-chain alcohols, polar aprotic solvents, siloxanes, hydrofluoroethers, dibasic esters, and aliphatic hydrocarbons solvents or similar solvents or mixtures of such solvents are organic solvents that can be used in the present invention, as shown in the test results below. Table 1 shows results of detergency testing for each of a number of solvents that may be suitable for use in the present invention. Table 2 shows results of testing of drying and extraction of those solvents using densified carbon dioxide.

Detergency tests were performed using a number of different solvents without detergents, co-solvents, or other additives. The solvents selected for testing include organic solvents and liquid carbon dioxide. Two aspects of detergency were investigated—soil removal and soil redeposition. The former refers to the ability of a solvent to remove soil from a substrate while the latter refers to the ability of a solvent to prevent soil from being redeposited on a substrate during the cleaning process. Wascherei Forschungs Institute, Krefeld Germany ("WFK") standard soiled swatches that have been stained with a range of insoluble materials and WFK white cotton swatches, both obtained from TESTFABRICS, Inc., were used to evaluate soil removal and soil redeposition, respectively.

Soil removal and redeposition for each solvent was quantified using the Delta Whiteness Index. This method entails measuring the Whiteness Index of each swatch before and after processing. The Delta Whiteness Index is calculated by subtracting the Whiteness Index of the swatch before processing from the Whiteness Index of the swatch after processing. The Whiteness Index is a function of the light reflectance of the swatch and in this application is an indication of the amount of soil on the swatch. More soil results in a lower light reflectance and Whiteness Index for the swatch. The Whiteness indices were measured using a reflectometer manufactured by Hunter Laboratories.

Organic solvent testing was carried out in a Launder-Ometer while the densified carbon dioxide testing was carried out in a Parr Bomb. After measuring their Whiteness Indices, two WFK standard soil swatches and two WFK white cotton swatches were placed in a Launder-Ometer cup with 25 stainless steel ball bearings and 150 mL of the solvent of interest. The cup was then sealed, placed in the Launder-Ometer and agitated for a specified length of time. Afterwards, the swatches were removed and placed in a Parr Bomb equipped with a mesh basket. Approximately 1.5 liters of liquid carbon dioxide between 5° C. and 25° C. and 570 psig and 830 psig was transferred to the Parr Bomb. After several minutes the Parr Bomb was vented and the dry swatches removed and allowed to reach room temperature. Testing of densified carbon dioxide was carried out in the same manner but test swatches were treated for 20 minutes. During this time the liquid carbon dioxide was stirred using an agitator mounted on the inside cover of the Parr bomb. The Whiteness Index of the processed swatches was determined using the reflectometer. The two Delta Whiteness Indices obtained for each pair of swatches were averaged. The results are presented in Table 1.

Because the Delta Whiteness Index is calculated by subtracting the Whiteness Index of a swatch before processing from the Whiteness Index value after processing, a positive Delta Whiteness Index indicates that there was an increase in Whiteness Index as a result of processing. In practical terms, this means that soil was removed during processing. In fact, the higher the Delta Whiteness Value, the more soil was removed from the swatch during processing. Each of the organic solvents tested exhibited soil removal capabilities. The WFK white cotton swatches exhibited a decrease in Delta Whiteness Indices indicating that the soil was deposited on the swatches during the cleaning process. Therefore, a "less negative" Delta Whiteness Index suggests that less soil was redeposited.

TABLE 1

| Solvent | Cleaning Time (min.) | Delta Whiteness Values: Insoluble Soil Removal | Delta Whiteness Values: Insoluble Soil Redeposition |
|---|---|---|---|
| Liquid carbon dioxide (neat) | 20 | 336 | −1.23 |
| Pine oil | 12 | 8.49 | −6.84 |
| d-limonene | 12 | 10.6 | −9.2 |
| 1,1-2 trichlorotrifluoroethane | 12 | 11.7 | −14.46 |
| N-propyl bromide | 12 | 11.18 | −9.45 |
| Perfluorohexane | 12 | 2.09 | −6.42 |
| triethylene glycol mono-oleyl ether (Volpo 3) | 12 | 10.54* | −1.86* |
| α-phenyl-ω-hydroxy-poly(oxy-1,2-ethanediyl) | 12 | 1.54** | −13.6** |
| Hexlene glycol | 12 | 6.9 | −1.4 |
| Tetraethylene glycol dimethyl ether | 12 | 10.08 | −4.94 |
| Ethylene glycol diacetate | 12 | 6.29 | −3.39 |
| Decyl acetates (Exxate 1000) | 12 | 11.69 | −8.6 |
| Tridecyl acetates (Exxate 1300) | 12 | 11.24 | −4.86 |
| Soy methyl esters (SoyGold 1100) | 12 | 5.81 | −7.71 |
| 2-ethylhexanol | 12 | 12.6 | −3.4 |
| Propylene carbonate | 12 | 2.99 | −1.82 |
| Dimethylsulfoxide | 12 | 5.84 | −0.22 |
| Dimethylformamide | 12 | 7.24 | −10.09 |
| Isoparaffins (DF-2000) | 12 | 11.23 | −5.95 |
| Dimethylglutarate | 12 | 9.04 | −1.23 |

*After two extraction cycles.
**After three extraction cycles.

To evaluate the ability of densified carbon dioxide to extract organic solvent from a substrate, WFK white cotton swatches were used. One swatch was weighed dry and then immersed in an organic solvent sample. Excess solvent was removed from the swatch using a ringer manufactured by Atlas Electric Devices Company. The damp swatch was re-weighed to determine the amount of solvent retained in the fabric. After placing the damp swatch in a Parr Bomb densified carbon dioxide was transferred to the Parr Bomb. The temperature and pressure of the densified carbon dioxide for all of the trials ranged from 5° C. to 20° C. and from 570 psig-830 psig. After five minutes the Parr Bomb was vented and the swatch removed. The swatch was next subjected to Soxhlet extraction using methylene chloride for a minimum of two hours. This apparatus enables the swatch to be continuously extracted to remove the organic solvent from the swatch. After determining the concentration of the organic solvent in the extract using gas chromatography, the amount of organic solvent remaining on the swatch after exposure to densified carbon dioxide was calculated by multiplying the concentration of the organic solvent in the extract by the volume of the extract. A different swatch was used for each of the tests. The results of these tests are included in Table 2. As the results indicate, the extraction process using densified carbon dioxide is extremely effective.

TABLE 2

| Solvent | Weight of Solvent on Test Swatch (grams): Before Extraction | Weight of Solvent on Test Swatch (grams): After Extraction | Percentage by Weight of Solvent Removed from Swatch |
|---|---|---|---|
| Pine oil | 7.8 | 0.1835 | 97.66% |
| d-Limonene | 5.8 | 0.0014 | 99.98% |
| 1,1 2-Trichlorotrifluoroethane | 1.4 | 0.0005 | 99.96% |
| N-Propyl bromide | 2.8 | <0.447 | >84% |
| Perfluorohexane | 1.0 | 0.0006 | 99.94% |
| Triethylene glycol monooleyl ether(7) | 0.8 | 0.1824 | 77.88% |
| α-phenyl-ω-hydroxy-poly (oxy 1,2-ethanediyl); (Ethylan HB4) | 16.0 | 5.7 | 645% |
| Hexylene glycol | 4.9 | 0.3481 | 92.87% |
| Tetraethylene glycol dimethyl ether | 5.2 | .1310 | 97.48% |
| Ethylene glycol diacetate | 53 | 0.0418 | 99.21% |
| Decyl acetate(2) | 2.4 | 0.0015 | 99.94% |
| Tridecyl acetate(1) | 4.8 | 0.0605 | 98.75% |
| Soy methyl esters(8) | 4.9 | 0.0720 | 98.54% |
| 2-Ethylhexanol | 0.5 | 0.0599 | 99.09% |
| Propylene carbonate | 6.6 | 0.0599 | 99.09% |
| Dimethyl sulfoxide | 33 | 0.5643 | 82.69% |
| Dimethylformamide | 3.0 | 0.0635 | 97.88% |
| Octamethylcyclooctasiloxane/ Decamethylcyclopentasiloxane (4) | 5.5 | 0.0017 | 99.97% |
| 1-Methoxynonofluorobutane(6) | 0.7 | not detected | −100% |
| Isoparaffin(5) | 4.3 | 0.0019 | 99.96% |
| Dimethyl glutarate(3) ‡ | 5.8 | 0.0090 | 99.85% |

Notes on Table 3:
(1)Exxate 1300 (Exxon);
(2)Exxate 1000 (Exxon);
(3)DBE-5 (DuPont);
(4)SF1204 (General Electric Silicones);
(5)DF-2000 (Exxon);
(6)HFE-7100 (3M);
(7)Volpo 3 (Crods);
(8)Soy Gold 1100 (AG Environmental Products)

It is to be understood that a wide range of changes and modifications to the embodiments described above will be apparent to those skilled in the art and are contemplated. It is therefore, intended that the foregoing detailed description be regarded as illustrative rather than limiting, and that it be understood that it is the following claims, including all equivalents, that are intended to define the spirit and scope of the invention.

What is claimed is:

1. A process for removing contaminants from one or more substrates that comprise contaminants, the process comprising steps of:

(a) placing the one or more substrates in a rotatable cleaning unit;

(b) placing the rotatable cleaning unit in a pressurizable vessel;

(c) adding organic solvent to at least one of the vessel and the cleaning unit;

(d) imparting movement of the cleaning unit under substantially non-pressurized conditions;

(e) removing a first portion of the organic solvent from the vessel;

(f) pressurizing the vessel;

(g) adding pressurized fluid solvent to the vessel to form an organic solvent-pressurized fluid solvent mixture;

(h) removing at least a portion of the mixture from the pressurized vessel;

(i) depressurizing the vessel to form vaporized fluid solvent and substantially dry, clean one or more substrates; and (j) removing at least a portion of the dry, clean one or more substrates from the vessel; wherein:

steps (a)-(b) occur in any order or substantially simultaneously.

2. The process of claim 1 wherein the rotatable cleaning unit is perforated.

3. The process of claim 2 wherein the rotatable cleaning unit is selected from the group consisting of a drum and a wheel.

4. The process of claim 1 wherein step (b) occurs prior to step (a).

5. The process of claim 1 further comprising a step of adding at least one additive to the organic solvent prior to, during or immediately after step (c).

6. The process of claim 5 wherein the at least one additive is selected to enhance removal of the contaminants from the one or more substrates.

7. The process of claim 5 wherein the at least one additive is selected to enhance cleaning of the process.

8. The process of claim 1 further comprising a step of adding at least one additive to the vessel prior to step (c).

9. The process of claim 1 wherein step (d) further comprises cycling at least a portion of the organic solvent from the vessel and through a filtration assembly to form filtered organic solvent, and reintroducing the filtered organic solvent into the vessel.

10. The process of claim 9 wherein said filtration assembly comprises a filter selected from the group consisting of a mesh filter, an absorption filter and an adsorption filter.

11. The process of claim 1 wherein the movement in step (d) comprises agitation.

12. The process of claim 1 wherein the movement in step (d) comprises rotation.

13. The process of claim 12 further comprising a step of separating contaminants from the first portion of organic solvent upon removal of said first portion of organic solvent from the vessel in step (e).

14. The process of claim 2 wherein removing step (h) is performed by pumping a portion of the mixture away from the vessel.

15. The process of claim 14 wherein after step (h) but prior to step (i), the cleaning unit is rotated to remove a remaining portion of mixture from the at least one substrate.

16. The process of claim 15 wherein the unit is rotated at a rate of about 150 to about 800 rpm.

17. The process of claim 1 further comprising a step of collecting at least a portion of the vaporized fluid solvent formed in step (i) and compressing it for subsequent use as pressurized fluid solvent.

18. The process of claim 1 further comprising repeating steps (g) and (h) one or more times prior to performing said step (i).

19. The process of claim 1 further comprising a step of spot treating the substrates prior to step (a).

20. The process of claim 1 wherein the substrates comprise textiles.

21. The process of claim 1 wherein the pressurized fluid solvent is inorganic.

22. The process of claim 1 wherein the pressurized fluid solvent comprises a compound selected from the group consisting of carbon dioxide, xenon, nitrous oxide and sulfur hexafluoride.

23. The process of claim 1 wherein the pressurized fluid solvent comprises liquid, supercritical or subcritical carbon dioxide.

24. The process of claim 1 wherein the organic solvent has a flash point, if any, of at least about 100° F.

25. The process of claim 1 wherein the organic solvent is soluble in the pressurized fluid solvent.

26. The process of claim 1 wherein the organic solvent comprises a compound of formula $C_aX_jH_kO_z$, wherein:

a=5n and $1 \leqq n \leqq 3$;

each X is independently F, Cl, Br or I;

$0 \leqq z \leqq 4$;

$0 \leqq j \leqq 10$;

$0 \leqq k$ 10; and $0 \leqq (j+k) \leqq 10n$.

27. The process of claim 1 wherein the organic solvent comprises a compound of formula $C_nX_jH_k$ wherein:

$1 \leqq n \leqq 20$;

each X is independently F, Cl, Br or I;

$0 \leqq j$;

$k \leqq 2n+2$; and $2n-4 \leqq (j+k) \leqq 2n+2$.

28. The process of claim 1 wherein the organic solvent comprises a compound of formula

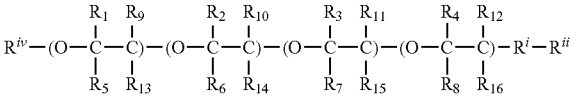

wherein:

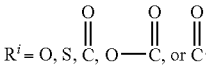

$R^{iv}=C_jH_uX_v$;

$R^{ii}=C_kH_yX_z$ or benzyl, phenyl, partially or fully fluorinated benzyl or phenyl;

$0 \leqq u, v \leqq 2j+1$;

$0 \leqq (u+v) \leqq 2j+1$;

$0 \leqq y,z \leqq 2k+1$;

$0 \leqq (y+z) \leqq 2k+1$;

$0 \leqq u,v,y,z \leqq 37$;

$R_{1-4}$ and $R_{9-12}$ are independently $C_mH_nX_p$,
where $0 \leqq m \leqq 2$;
$0 \leqq (n+p) \leqq 5$; and
$n+p=2m+1$;

$R_{5-8}$ and $R_{13-16}$ are independently $C_aH_bX_d$,
wherein a is 0 or 1;
$0 \leqq (b+d) \leqq 3$; and
$b+d=2a+1$; and each X is independently F, Cl, Br or I.

29. The process of claim 1 wherein the organic solvent comprises a compound of formula

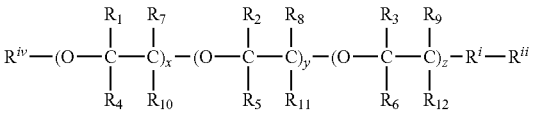

wherein:

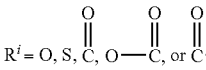

$R^{iv}=C_jH_uX_v$;

$R^{ii}=C_kH_yX_z$ or benzyl, phenyl, partially or fully fluorinated benzyl or phenyl;

j and k each equal 0 independently or $14-3(x+y+z)\leqq j\leqq 22-3(x+y+z)$;

$14-3(x+y+z)\leqq k\leqq 22-3(x+y+z)$ and $14-3(x+y+z)\leqq (j+k)\leqq 22-3(x+y+z)$;

$0\leqq x,y,z\leqq 1$;

$0\leqq (x+y+z)\leqq 3$;

$0\leqq u,v,y,z\leqq 37$;

$0\leqq (u+v)\leqq 2j+1$;

$0\leqq (y+z)\leqq 2k+1$;

$R_{1-3}$ and $R_{7-9}$ are independently $C_mH_nX_p$,
where $0\leqq m\leqq 2$;
$0\leqq (n+p)\leqq 5$; and
$n+p=2m+1$;
$R_{4-6}$ and $R_{10-12}$ are independently $C_aH_bX_d$,
wherein a is 0 or 1;
$0\leqq (b+d)\leqq 3$; and
$b+d=2a+1$; and each X is independently F, Cl, Br or I.

30. The process of claim 1 wherein the organic solvent comprises a compound of formula $C_nH_jX_k(OH)_r$ wherein:

each X is independently F, Cl, Br or I;

$1\leqq n\leqq 20$;

$0\leqq r\leqq 4$;

$0\leqq j\leqq 2n+2-r$;

$0\leqq k\leqq 2n+2-r$; and $2n-4-r\leqq (j+k)\leqq 2n+2-r$.

31. The process of claim 1 wherein the organic solvent comprises a compound of formula $C_nH_jX_k\mathbf{0}_b$ wherein:

each X is independently F, Cl, Br or I;

$2\leqq n\leqq 20$;

$0\leqq j\leqq 2n+2$;

$0\leqq k\leqq 2n+2$;

$2n-4\leqq (j+k)\leqq 2n+2$; and $1\leqq b\leqq 6$.

32. The process of claim 1 wherein the organic solvent comprises a compound of formula

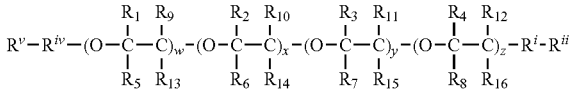

wherein:

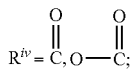

$R^{iv}$ = C, O—C;

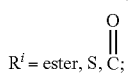

$R^{i}$ = ester, S, C;

$R^{v}=C_jH_uX_v$;

$R^{ii}=C_kH_aX_b$;

$15\leqq j,k\leqq 32-3(w+x+y+z)$;

$15\leqq j+k\leqq 32-3(w+x+y+z)$;

$0\leqq u,v\leqq 2j+1$;

$0\leqq a$;

b2k+1;

$2j-7\leqq (u+v)\leqq 2j+1$;

$2k-7\leqq (y+z)\leqq 2k+1$; and $R_{1-4}$ and $R_{9-12}$ are independently $C_mH_nX_p$,
wherein $0\leqq m\leqq 2$;
$0\leqq (n+p)\leqq 5$; and
$n+p=2m+1$;

$R_{5-8}$ and R13-16 are independently $C_aH_bX_d$,
wherein a is 0or 1;
$0\leqq (b+d)\leqq 3$; and
$b+d=2a+1$; and each X is independently F, Cl, Br or I.

33. The process of claim 1 wherein the organic solvent is of the structural formula:

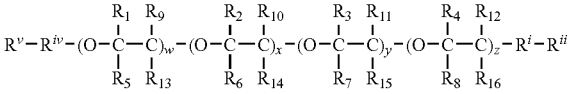

wherein:

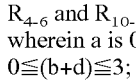

$R^{i}$ = ester, S, C;

$R^{iv}=C_jH_uX_v$;

$R^{v}=C_jH_uX_v$;

$R^{ii}=C_kH_aX_b$;

$15\leqq j,k\leqq 32-3(w+x+y+z)$;

$15\leqq j+k\leqq 32-3(w+x+y+z)$;

$0\leqq u,v\leqq 2j+1$;

$0\leqq a$;

$b\leqq 2k+1$;

$2j-7\leqq (u+v)\leqq 2j+1$;

$2k-7\leqq (y+z)\leqq 2k+1$; and $R_{1-4}$ and $R_{9-12}$ are independently $C_mH_nX_p$,
wherein $0\leqq m\leqq 2$;
$0\leqq (n+p)\leqq 5$; and
$n+p=2m+1$;

$R_{5-8}$ and $R_{13-16}$ are independently $C_aH_bX_d$,
wherein a is 0 or 1;
$0\leqq (b+d)\leqq 3$; and
$b+d=2a+1$; and each X is independently F, Cl, Br or I.

34. The process of claim 1 wherein the organic solvent is of the structural formula: $C_n(CO_2)_mH_aX_b$ wherein:

each X is independently F, Cl, Br or I;

$2\leqq n\leqq 21$;

$1\leqq m\leqq 3$;

$0\leqq a$;

$b\leqq 2n+2$; and $2n-2\leqq (a+b)\leqq 2n+z$.

35. The process of claim 1 wherein the organic solvent is of the structural formula: $C_n(C_{03})_mH_aX_b$ wherein:

each X is independently F, Cl, Br or I;

$2\leqq n\leqq 18$;

m=1;

$0\leqq a$;

$b\leqq 2n+2$; and $2n-4\leqq (a+b)\leqq 2n+z$.

36. The process of claim 1 wherein the organic solvent is of the structural formula:

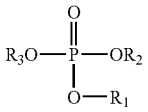

wherein:

$R_1=C_jH_aX_b$ $1 \leqq j \leqq 6$ $0 \leqq a$;

$b \leqq 2j+1$; and $2j-7 \leqq (a+b) \leqq 2j+1$;

$R_2=C_kH_dX_e$ $1 \leqq k \leqq 6$;

$0 \leqq d$;

$e \leqq 2k+1$; and $d+e=2k+1$;

$R_3=C_mH_eX_f$ $1 \leqq m \leqq 6$;

$0 \leqq e$;

$f \leqq 2m+1$; and $e+f=2m+1$; and each X is independently F, Cl, Br or I.

37. The process of claim 1 wherein the organic solvent is of the structural formula: $SO_eC_nH_jX_k$ wherein:

each X is independently F, Cl, Br or I;

$1 \leqq e \leqq 2$;

$2 \leqq n \leqq 8$;

$0 \leqq j$;

$k \leqq 2a+1$; and $2n \leqq (j+k) \leqq 2n+1$.

38. The process of claim 1 wherein the organic solvent is of the structural formula: $C_nH_yN_aO_b$ wherein:

$1 \leqq n \leqq 10$;

$1 \leqq a$;

$b \leqq 2$ and $a=b$; and $2n-1 \leqq y \leqq 2n+1$.

39. The process of claim 1 wherein the organic solvent is of the structural formula:

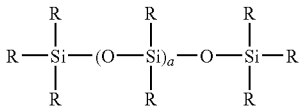

wherein:

each R equals $C_aX_yH_z$ independently;

each X is independently F, Cl, Br or I;

$1 \leqq a \leqq 3$; and $0 \leqq y,z \leqq 2a+1$ and $y+z=2a+1$.

40. The process of claim 1 wherein the organic solvent is of the structural formula:

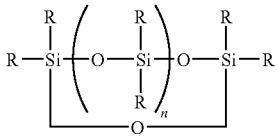

wherein:

$2 \leqq n \leqq 4$;

each R equals $C_aH_yX_z$ independently;

each X is independently F, Cl, Br or I;

$1 \leqq n \leqq 3$

0y;

$z \leqq 2a+1$ and $y+z=2a+1$.

* * * * *